(12) United States Patent
Hoffmann et al.

(10) Patent No.: US 8,906,184 B2
(45) Date of Patent: Dec. 9, 2014

(54) METHOD FOR PRODUCING A MICRO-OPTICAL DISPLAY ARRANGEMENT

(75) Inventors: Lars Hoffmann, Freising (DE); Manfred Dotzler, Lenggries (DE); Manfred Heim, Bad Tolz (DE); Marius Dichtl, Munich (DE); Michael Rahm, Hemau (DE); Ralf Liebler, Schliersee (DE)

(73) Assignee: Giesecke & Devrient GmbH, Munich (DE)

( * ) Notice: Subject to any disclaimer, the term of this patent is extended or adjusted under 35 U.S.C. 154(b) by 609 days.

(21) Appl. No.: 12/935,320

(22) PCT Filed: Apr. 1, 2009

(86) PCT No.: PCT/EP2009/002365
§ 371 (c)(1),
(2), (4) Date: Sep. 29, 2010

(87) PCT Pub. No.: WO2009/121578
PCT Pub. Date: Oct. 8, 2009

(65) Prior Publication Data
US 2011/0027538 A1 Feb. 3, 2011

(30) Foreign Application Priority Data
Apr. 2, 2008 (DE) .......... 10 2008 016 795

(51) Int. Cl.
*B32B 3/00* (2006.01)
*B32B 38/06* (2006.01)
*B41M 3/14* (2006.01)
*B42D 15/00* (2006.01)
*G02B 3/00* (2006.01)

(52) U.S. Cl.
CPC ............ *G02B 3/0031* (2013.01); *B41M 3/148* (2013.01); *B42D 15/002* (2013.01); *G02B 3/0056* (2013.01); *B42D 2035/44* (2013.01); *B42D 2035/20* (2013.01)
USPC ........................................... 156/242; 156/219

(58) Field of Classification Search
CPC . B41M 3/148; B42D 15/002; B42D 2035/20; B42D 2035/44; G02B 3/0031
USPC ............................................................ 156/242
See application file for complete search history.

(56) References Cited

U.S. PATENT DOCUMENTS 7,667,894 B2 2/2010 Hoffmuller
7,728,931 B2 6/2010 Hoffmuller
(Continued)

FOREIGN PATENT DOCUMENTS

DE 102005062132 A1 7/2007
DE 102006029852 A1 1/2008
(Continued)

OTHER PUBLICATIONS

Hutley M.C. et al., The moiré magnifier, Pure Appl. Opt. 3:133-142, 1994.
(Continued)

*Primary Examiner* — Philip Tucker
*Assistant Examiner* — Vicki Wu
(74) *Attorney, Agent, or Firm* — Lathrop & Gage LLP

(57) ABSTRACT

The present invention relates to a method for producing, for the depiction of a specified motif, a micro-optical depiction arrangement that exhibits a colored motif grid, composed of a plurality of micromotif elements, and a focusing element grid, composed of a plurality of microfocusing elements that reconstructs the specified motif when the micromotif elements are viewed.

18 Claims, 6 Drawing Sheets

(56) References Cited

U.S. PATENT DOCUMENTS

Figure 1:
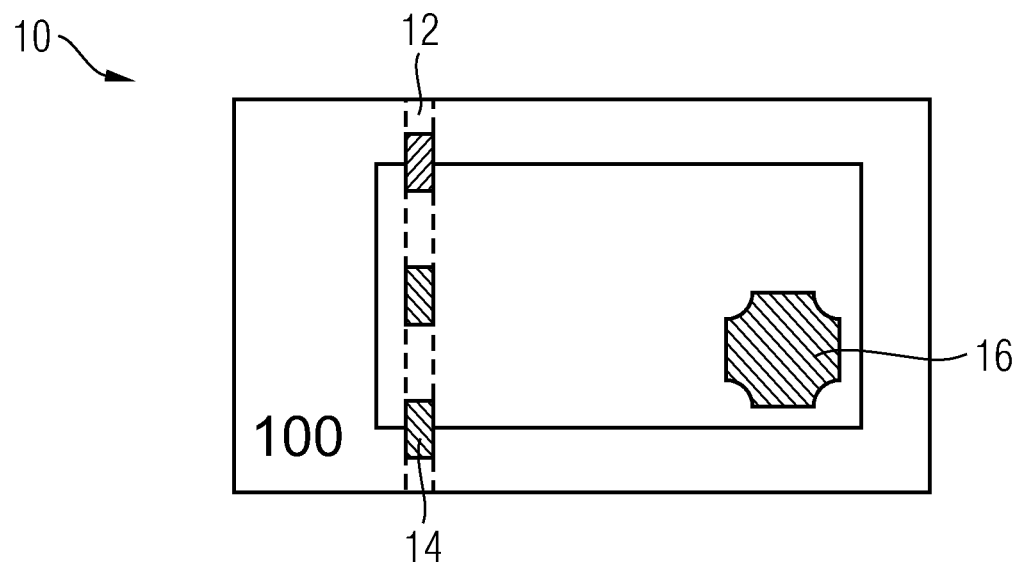

| | | | |
|---|---|---|---|
| 7,808,605 B2 | 10/2010 | Hoffmuller | |
| 7,986,459 B2 | 7/2011 | Kaule | |
| 8,083,894 B2 | 12/2011 | Gruszczynski | |
| 8,149,511 B2 | 4/2012 | Kaule | |
| 2003/0179364 A1* | 9/2003 | Steenblik et al. | 356/71 |
| 2007/0165182 A1 | 7/2007 | Hoffmuller | |
| 2007/0211238 A1 | 9/2007 | Hoffmuller | |
| 2007/0216518 A1 | 9/2007 | Hoffmuller | |
| 2007/0229928 A1 | 10/2007 | Hoffmuller | |
| 2007/0241553 A1 | 10/2007 | Heim | |
| 2007/0246933 A1 | 10/2007 | Heim | |
| 2007/0274559 A1 | 11/2007 | Depta | |
| 2008/0014378 A1 | 1/2008 | Hoffmuller | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1* | 7/2008 | Kaule et al. | 428/29 |
| 2008/0163994 A1 | 7/2008 | Hoppe | |
| 2008/0198468 A1 | 8/2008 | Kaule | |
| 2008/0212193 A1* | 9/2008 | Steenblik et al. | 359/619 |
| 2008/0216976 A1 | 9/2008 | Ruck | |
| 2008/0250954 A1 | 10/2008 | Depta | |
| 2008/0258456 A1 | 10/2008 | Rahm | |
| 2009/0001709 A1 | 1/2009 | Kretschmar | |
| 2009/0008923 A1 | 1/2009 | Kaule et al. | |
| 2009/0008926 A1 | 1/2009 | Depta | |
| 2009/0042320 A1* | 2/2009 | Wang et al. | 438/5 |
| 2009/0102605 A1 | 4/2009 | Kaule | |
| 2009/0115185 A1 | 5/2009 | Hoffmuller | |
| 2009/0133804 A1* | 5/2009 | Kanematsu et al. | 156/87 |
| 2009/0236061 A1 | 9/2009 | Gruszczynski | |
| 2009/0297805 A1 | 12/2009 | Dichtl | |
| 2009/0322071 A1 | 12/2009 | Dichtl | |
| 2010/0175843 A1 | 7/2010 | Gregarek | |
| 2010/0177094 A1 | 7/2010 | Kaule | |
| 2010/0182221 A1 | 7/2010 | Kaule | |
| 2010/0194091 A1 | 8/2010 | Heim | |
| 2010/0194532 A1 | 8/2010 | Kaule | |
| 2010/0196587 A1 | 8/2010 | Keller | |
| 2010/0207376 A1 | 8/2010 | Heim | |
| 2010/0208036 A1 | 8/2010 | Kaule | |
| 2010/0307705 A1* | 12/2010 | Rahm et al. | 162/140 |
| 2010/0308570 A1 | 12/2010 | Heim | |
| 2010/0320742 A1 | 12/2010 | Hoffmuller | |
| 2011/0007374 A1 | 1/2011 | Heim | |
| 2011/0012337 A1 | 1/2011 | Heim | |
| 2011/0023734 A1* | 2/2011 | Hoffmann | 101/23 |
| 2011/0027538 A1 | 2/2011 | Hoffmann | |
| 2011/0045248 A1 | 2/2011 | Hoffmuller | |
| 2011/0069360 A1 | 3/2011 | Dichtl | |
| 2011/0079997 A1 | 4/2011 | Heim | |
| 2011/0091665 A1 | 4/2011 | Heim | |
| 2011/0095518 A1 | 4/2011 | Hoffmuller | |
| 2011/0101670 A1 | 5/2011 | Heim | |
| 2011/0109078 A1 | 5/2011 | Hoffmuller | |
| 2011/0114733 A1 | 5/2011 | Heim | |
| 2011/0157183 A1 | 6/2011 | Kaule | |
| 2012/0126525 A1 | 5/2012 | Dorfler | |
| 2012/0168515 A1 | 7/2012 | Schutzmann | |
| 2012/0170124 A1 | 7/2012 | Fuhse | |

FOREIGN PATENT DOCUMENTS

| | | |
|---|---|---|
| DE | 102007029203 A1 | 1/2009 |
| DE | 102007063277 A1 | 7/2009 |
| EP | 0064067 A1 | 11/1982 |
| EP | 0330733 A1 | 9/1989 |
| WO | WO 2005/052650 A2 | 6/2005 |
| WO | WO 2005/106601 A2 | 11/2005 |
| WO | WO 2005105473 | 11/2005 |
| WO | WO 2005105474 | 11/2005 |
| WO | WO 2005105475 | 11/2005 |
| WO | WO 2005106601 A2 * | 11/2005 |
| WO | WO 2005108106 | 11/2005 |
| WO | WO 2005108108 | 11/2005 |
| WO | WO 2005108110 | 11/2005 |
| WO | WO 2006005434 | 1/2006 |
| WO | WO 2006015733 | 2/2006 |
| WO | WO 2006018171 | 2/2006 |
| WO | WO 2006018172 | 2/2006 |
| WO | WO 2006040069 | 4/2006 |
| WO | WO 2006056342 | 6/2006 |
| WO | WO 2006072380 | 7/2006 |
| WO | WO 2006/087138 A1 | 8/2006 |
| WO | WO 2006087138 | 8/2006 |
| WO | WO 2006099971 | 9/2006 |
| WO | WO 2006/125224 A2 | 11/2006 |
| WO | WO 2006119896 | 11/2006 |
| WO | WO 2006128607 | 12/2006 |
| WO | WO 2007006445 | 1/2007 |
| WO | WO 2007006455 | 1/2007 |
| WO | WO 2007/076952 A2 | 7/2007 |
| WO | WO 2007076952 | 7/2007 |
| WO | WO 2007079851 | 7/2007 |
| WO | WO 2007115648 | 10/2007 |
| WO | WO 2008/000350 | 1/2008 |
| WO | WO 2008/000350 A1 | 1/2008 |
| WO | WO 2008/000351 | 1/2008 |
| WO | WO 2008/049533 | 5/2008 |
| WO | WO 2008/061636 | 5/2008 |
| WO | WO 2008/071325 | 6/2008 |
| WO | WO 2009/000527 | 12/2008 |
| WO | WO 2009/000527 A1 | 12/2008 |
| WO | WO 2009/000528 | 12/2008 |
| WO | WO 2009/000528 A2 | 12/2008 |
| WO | WO 2009/000529 | 12/2008 |
| WO | WO 2009/000530 | 12/2008 |
| WO | WO 2009/012893 | 1/2009 |
| WO | WO 2009/024265 | 2/2009 |
| WO | WO 2009/080262 | 7/2009 |
| WO | WO 2009/080263 | 7/2009 |
| WO | WO 2009/083146 | 7/2009 |
| WO | WO 2009/083146 A2 | 7/2009 |
| WO | WO 2009/083151 | 7/2009 |
| WO | WO 2009/083151 A1 | 7/2009 |
| WO | WO 2009/100831 | 8/2009 |
| WO | WO 2009/100869 | 8/2009 |
| WO | WO 2009/109291 | 9/2009 |
| WO | WO 2009/121578 | 10/2009 |
| WO | WO 2009/149831 | 12/2009 |
| WO | WO 2009/149833 | 12/2009 |
| WO | WO 2009/156079 | 12/2009 |
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

International Search Report, International Application No. PCT/EP2009/002365, 2 pages, Oct. 16, 2009.

International Preliminary Report on Patentability, International Application No. PCT/EP2009/002365, 12 pages, Dec. 15, 2010, English Translation.

* cited by examiner

METHOD FOR PRODUCING A MICRO-OPTICAL DISPLAY ARRANGEMENT

CROSS-REFERENCE TO RELATED APPLICATIONS

This application is the U.S. National Stage of International Application No. PCT/EP2009/002365, filed Apr. 2, 2009, which claims the benefit of German Patent Application DE 10 2008 016 795.9, filed Apr. 2, 2008; both of which are hereby incorporated by reference to the extent not inconsistent with the disclosure herewith.

The present invention relates to methods for producing a micro-optical depiction arrangement, as well as an object, especially a data carrier or a security element having such a depiction arrangement.

For protection, data carriers, such as value or identification documents, but also other valuable objects, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanopatterns, such as with conventional embossed holograms or other hologram-like diffraction patterns, as are described, for example, in publications EP 0 330 733 A1 and EP 0 064 067 A1.

Also so-called moiré magnification arrangements have been in use for some time as security features. The fundamental functional principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid composed of identical image objects is viewed through a lens grid having approximately the same grid dimension. As with every pair of similar grids, a moiré pattern results, each of the moiré strips in this case appearing in the shape of a magnified and rotated image of the repeated elements of the image grid.

Based on that, it is the object of the present invention to avoid the disadvantages of the background art and especially to specify an advantageous method for manufacturing micro-optical moiré magnification arrangements or general micro-optical depiction arrangements.

This object is solved by the method having the features of the main claim. An object having such a micro-optical depiction arrangement is specified in the coordinated claims. Developments of the present invention are the subject of the dependent claims.

The present invention relates especially to a method for producing, for the depiction of a specified motif, a micro-optical depiction arrangement that exhibits a colored motif grid composed of a plurality of micromotif elements, and a focusing element grid composed of a plurality of microfocusing elements, and that reconstructs the specified motif when the micromotif elements are viewed, and in the method, T1) a first substrate foil having opposing main surfaces is provided, and an embossing lacquer is applied on a first main surface of the first substrate foil and is embossed in the form of the focusing element grid composed of an at least locally periodic arrangement of a plurality of microfocusing elements, T2) a second substrate foil having opposing main surfaces is provided, and an arrangement of colored micromotif elements is produced in the form of the motif grid on a first main surface of the second substrate foil, and K) the second substrate foil is laminated, with at least one laminating adhesive, onto the second main surface, opposite the focusing element grid, of the first substrate foil.

Here, the micro-optical depiction arrangement can be executed especially as a moiré magnification arrangement, as a moiré-type micro-optical magnification arrangement or as a modulo magnification arrangement. The functional principle and the properties of these micro-optical depiction arrangements are described in detail in German patent applications DE 10 2005 062 132.5 and DE 10 2007 029 203.3 and in international applications PCT/EP2006/012374, PCT/EP2008/005171 and PCT/EP2008/005172, the disclosures of which are incorporated in the present application by reference.

In a preferred variant of the present invention, in step T2), first, in a step

T2P) the second substrate foil having opposing main surfaces is provided, and an embossing lacquer is applied on the first main surface of the second substrate foil and embossed in the form of the motif grid composed of an arrangement of micropatterns whose shapes correspond to the desired micromotif elements, and in a step T2F) the embossed micropatterns of the second substrate foil are filled with an ink.

By filling the micropatterns with an ink in step T2F), a contrast difference is created between the depressions in the embossed micropatterns and the surrounding raised regions, due to which the micromotif elements appear when the motif grid is viewed through the focusing element grid to reconstruct the specified motif.

Here, as the ink, in principle, any material can be used that produces a perceptible contrast to the surrounding embossing lacquer, especially opaque or transparent inks based on soluble dyes or on color pigments. Also transparent materials may be used if they produce a visible contrast of the filled micropatterns to the surrounding embossing lacquer in another way, for example through a different refractive index.

Further, also inks based on a lacquer medium having metallic nanoparticles may be used. In this variant of the present invention, the effect of the coloring is based, according to the current understanding, on the fact that, due to incident electromagnetic radiation, volume or surface plasmons in the nanoparticles are excited and/or resonance effects are induced. Advantageously, the metallic nanoparticles exhibit a largest dimension between 2 nm and 400 nm, preferably between 5 nm and 300 nm and particularly preferably between 10 nm and 200 nm. The metallic nanoparticles can be developed to be substantially spherical, but they can also be developed having a preferred direction, especially as rotation ellipsoids or in the shape of rods or platelets. In an advantageous embodiment, the metallic nanoparticles are formed from homogeneous metallic particles, especially from Au, Ag, Cu or Al particles, since with these, color effects are observable in the visible spectral range. In addition, also other metals may be considered, such as Ni, Cr, Wo, Vd, Pd and Pt, as well as alloys of one or more of the cited metals. Alternatively, the metallic nanoparticles can be formed from core-shell particles in which one of the materials of the core and shell is a metal, especially Au, Ag, Cu, Al, another of the above-mentioned metals, or a metal alloy. The other of the materials of the core and shell is advantageously likewise a metal or a dielectric. Further details on the design and properties of these metallic nanoparticles can be found in application PCT/EP2008/010747, the disclosure of which is incorporated in the present application by reference.

The application of the ink to the micropattern can occur, in addition to the conventional methods known to the person of skill in the art, also through the transfer process described in application PCT/EP2008/010739, in which an imprint material is transferred to the micropattern with a printing tool, the viscosity of the imprint material being chosen such that the imprint material is selectively transferred substantially only to the depressions in the relief pattern. Here, especially a low-viscosity imprint material is chosen as the imprint material, and when selecting it, the surface tension of the imprint material is advantageously coordinated with the surface energy of the micropattern. In particular, imprint materials having a viscosity between about 3 mPa*s and about 1500 mPa*s at room temperature may be used. For a more detailed description of this ink transfer method and the associated advantages, reference is made to application PCT/EP2008/010739, the disclosure of which is incorporated in the present application by reference.

In an alternative, likewise advantageous variant of the present invention, the micro intaglio printing technique described in publication WO 2008/000350, which combines the advantages of printing and embossing technologies, can be used for the manufacture of the arrangement of colored micromotif elements on the second substrate foil in step T2). Summarized briefly, in the micro intaglio printing technique, a die form is provided whose surface exhibits an arrangement of elevations and depressions in the form of a desired micropattern. The depressions in the die form are filled with a curable colored lacquer, and the substrate foil to be printed on is pretreated for a good anchoring of the lacquer. Then the surface of the die form is brought into contact with the substrate foil, and the lacquer that, in the depressions in the die form, is in contact with the substrate foil is cured and, in the process, joined with the substrate foil. Thereafter, the surface of the die form is removed from the substrate foil again such that the cured lacquer that is joined with the substrate foil is pulled out of the depressions in the die form and forms the micromotif elements on the second substrate foil. For a more detailed description of the micro intaglio method and the associated advantages, reference is made to the cited publication WO 2008/000350, the disclosure of which is incorporated in the present application by reference.

In a preferred variant of the present invention, in step K), a transparent laminating adhesive is applied to the motif-grid-exhibiting first main surface of the second substrate foil, and the second substrate foil is laminated, with its first main surface, onto the second main surface of the first substrate foil. Alternatively, also a transparent laminating adhesive can be applied to the second main surface of the first substrate foil, opposite the focusing element grid, and the second substrate foil laminated, with its motif-grid-exhibiting first main surface, onto the second main surface of the first substrate foil. The coating weight and thus the applied thickness of the transparent laminating adhesive are chosen, in both variants, according to the desired spacing of the focusing element grid and the motif grid.

The second substrate foil can be removed after the lamination onto the first substrate foil, such that the focusing element grid and the motif grid are present on opposing sides of a single substrate foil. The laminating adhesive can, in step K), also be applied only partially such that, after the removal of the second substrate foil, a portion of the micropatterns remains on the first substrate foil, while the micropatterns in the regions that are not provided with laminating adhesive are removed together with the second substrate foil.

After the removal of the second substrate foil, the then exposed surface can be provided with a printing layer or a metalization. Alternatively, the embossing lacquer is anchored on the second substrate foil in step T2P), and the second substrate foil remains in the micro-optical depiction arrangement permanently. In this case, in step T2), preferably a plastic foil is provided as the substrate foil, especially a PET foil having a layer thickness between 6 µm and 23 µm, preferably of about 12 µm, to not let the layer thickness of the entire arrangement become too large.

After the lamination, the colored micropatterns lie inside between the embossing lacquer layer applied to the second substrate foil and that of the second substrate foil itself and the first substrate foil, such that they are excellently protected against external influences.

According to another, likewise preferred variant of the present invention, in step K), a transparent laminating adhesive is applied to the second main surface of the second substrate foil, opposite the motif grid, and the second substrate foil is laminated, with its second main surface, onto the second main surface of the first substrate foil. Alternatively, a transparent laminating adhesive can also be applied to the second main surface of the first substrate foil, opposite the focusing element grid, and the second substrate foil laminated, with its second main surface, opposite the motif grid, onto the second main surface of the first substrate foil. In this variant of the present invention, the reading direction of the micropatterns is laterally reversed. Both the colored micropatterns and the focusing element grid lie outside on the laminated composite.

In the cited inventive variants, in step T2F), especially an ink based on soluble dyes, an ink based on color pigments or an ink based on a lacquer medium having metallic nanoparticles can be applied to the embossed micropatterns. If, when applying the ink, excess ink results in the raised regions outside the embossed micropatterns, then this excess ink is expediently removed, for example squeegeed off, before the further processing. When removing the excess ink, in practice, a very thin toning film can remain in the raised regions, which, however, leaves the visual impression of these regions and the embossed micropatterns largely undisturbed.

Further, in the cited variants of the present invention, the embossing lacquer applied to the second substrate foil can also be designed to be colored. Here, the color of the embossing lacquer and the color of the filling of the embossed micropatterns are expediently chosen such that a perceptible contrast between the filled depressions in the embossed micropatterns and the surrounding embossing lacquer is produced. In this way, it is possible to obtain two-colored micro-optical depiction arrangements. To laminate the second substrate foil onto the second main surface of the first substrate foil in step K), a transparent laminating adhesive is preferably chosen.

According to another variant of the present invention, it is provided that, in step T2F), at least one colored laminating adhesive is applied to the motif-grid-exhibiting first main surface of the second substrate foil, which adhesive fills the micropatterns and serves to laminate the second substrate foil in step K). Alternatively, also at least one colored laminating adhesive can be applied to the second main surface of the first substrate foil, opposite the focusing element grid, and in step K), the second substrate foil laminated, with its motif-grid-exhibiting first main surface, onto the second main surface of the first substrate foil, the colored laminating adhesive applied there filling the micropatterns of the second substrate foil. In both variants, the coating weight of the at least one colored laminating adhesive is expediently chosen such that the embossed micropatterns are completely filled, and that the laminating adhesive is present in the region outside the micropatterns in a small layer thickness, especially a layer thickness of 3 μm or less, preferably of 2 μm or less, and particularly preferably of about 1 μm. In this way, a sufficiently high contrast between the filled depressions in the micropatterns and the surrounding regions is ensured.

Here, in an advantageous variant of the present invention, only a single colored laminating adhesive is provided, which takes on both the function of the coloring for the micropatterns and the function of joining the substrate foils.

Likewise advantageously, however, also multiple, especially two, different laminating adhesives can be used. Here, to increase the adhesion to the second substrate foil, a second laminating adhesive is preferably applied to a first, colored laminating adhesive that fills the micropatterns. The second laminating adhesive can be transparent or likewise colored. In the latter case, mixed colors can be produced as desired by combining the two colored laminating adhesives. Each of the multiple laminating adhesives can be applied contiguously or in a pattern to produce differently colored regions within the depiction arrangement. Here, it is expedient to apply at least one of the laminating adhesives contiguously to ensure that no gaps without a laminating adhesive coating are created within the area of the depiction arrangement.

For example, a first, colored laminating adhesive can be applied contiguously in such a way that it fills the micropatterns and is present outside the micropatterns only in a very small layer thickness. To the first laminating adhesive is then applied a second, colored laminating adhesive, the coating weight preferably being chosen according to the desired spacing of the focusing element grid and the motif grid.

If the second laminating adhesive is likewise applied contiguously, then, due to the small layer thickness of the first laminating adhesive, substantially the color of the second laminating adhesive results outside the micropatterns when viewed, while the mixed color of both laminating adhesives appears in the micropatterns. If the second laminating adhesive is applied only in some regions, then differently colored regions are created within the depiction arrangement.

Also in this variant of the present invention, the second substrate foil can be removed after the lamination onto the first substrate foil, the then exposed surface being able to be provided with a printing layer or a metalization. Alternatively, the embossing lacquer is anchored on the second substrate foil in step T2P), and the second substrate foil remains in the micro-optical depiction arrangement permanently. In this case, in step T2), preferably a plastic foil is provided as the substrate foil, especially a PET foil having a layer thickness between 6 μm and 23 μm, preferably of about 12 μm, to not let the layer thickness of the entire arrangement become too large.

To obtain two-colored micro-optical depiction arrangements, also in this variant of the present invention, the embossing lacquer applied to the second substrate foil can be colored. Here, the color of the embossing lacquer and the color of the colored laminating adhesive are expediently chosen such that a perceptible contrast between the filled depressions in the embossed micropatterns and the surrounding embossing lacquer is produced.

In all cited variants of the present invention, in step T1), preferably a plastic foil is provided as the substrate foil, especially a PET foil having a layer thickness between 6 μm and 60 μm, preferably between 6 μm and 36 μm. As the embossing lacquer, in step T1), preferably a thermoplastic or radiation-curing lacquer is applied. Radiation-curing lacquer layers can be curable both by UV irradiation and by electron irradiation. The layer thickness of the embossing lacquer layer applied in step T1) is preferably between μm and 15 μm, particularly preferably between 5 μm and 10 μm.

To obtain a desired visual appearance, the second main surface of the first substrate foil can be provided with a partial metalization before the lamination step K). Here, the partial metalization can be produced as part of a hologram or a thin-film element having a color-shift effect.

In addition to the motif grid provided on the first main surface of the second substrate foil, also the second main surface of the first substrate foil can be provided, before the lamination step K), with at least one further motif grid composed of an arrangement of second micromotif elements that reconstruct a second specified motif when the motif grid is viewed through the focusing element grid and, for example, in the case of a moiré magnification arrangement, appear moiré magnified. The second micromotif elements are preferably designed to be colored. If the color of the second micromotif elements of the second motif grid differs from the color of the filling of the embossed micropatterns of the first motif grid, then a two-colored micro-optical depiction arrangement can be obtained. If a colored embossing lacquer applied to the second substrate foil is used, even three-colored embodiments can be realized in this way. Multi-colored micro-optical depiction arrangements can also be obtained through a combination with a second, colored laminating adhesive, as described in greater detail above.

In order to not impair the perceptibility of the embossed micropatterns of the second substrate foil when they are viewed through the focusing element grid, at least the regions surrounding the second micromotif elements must be sufficiently transparent.

The second micromotif elements are advantageously imprinted on the second main surface of the first substrate foil. Alternatively, in a layer composed of embossing lacquer and applied to the second main surface of the first substrate foil, second micropatterns are embossed whose shapes correspond to the desired second micromotif elements. The embossed second micropatterns can be filled with an ink, with, in principle, any material that produces a perceptible contrast to the surrounding embossing lacquer being able to be used as the ink. If a colored embossing lacquer is used, care must be taken that it exhibits sufficient transparency, at least in the regions surrounding the second micromotif elements.

In an advantageous embodiment, the color of the filling of the embossed second micropatterns can also be provided through the colored laminating adhesive applied to the first main surface of the second substrate foil in step T2F). The coating weight of the colored laminating adhesive is expediently chosen such that both the embossed micropatterns of the first motif grid and the embossed micropatterns of the second motif grid are completely filled, and that the laminating adhesive is present in a small layer thickness in the region outside the micropatterns. Here, only a single colored laminating adhesive can be applied, or multiple, especially two different laminating adhesives can be used, such that mixed colors and/or differently colored regions can be produced within the depiction arrangement.

Both the motifs and the desired modulo or moiré magnification effects of the first and second micromotif elements can be designed to be independent of one another. Alternatively, the motifs of the first and second motif grid can also be associated in meaning.

In step T2P), a thermoplastic lacquer, for example, but preferably a radiation-curing lacquer is applied as the embossing lacquer, both UV-curing and electron-beam-curing lacquers being able to be used. The embossing lacquer is preferably applied in a layer thickness between 1 μm and 15 μm, preferably between 4 μm and 8 μm.

In advantageous embodiments, the micropatterns of the second substrate foil are formed having a pattern depth between about 1 μm and about 20 μm, preferably between about 10 μm and about 10 μm. The micromotif elements are preferably produced having a lateral dimension between about 5 μm and about 50 μm, preferably between about 10 μm and about 35 μm.

The micro-optical depiction arrangement, further, can be furnished with one or more function layers for use as a security element for security papers, value documents and the like, especially with a hot-melt feature, with protective layers, cover layers, adhesive layers or layers having visually and/or machine-perceptible security features.

The present invention also includes an object, especially a data carrier or a security element, having a micro-optical depiction arrangement produced in the manner described above.

According to a preferred embodiment, the micro-optical depiction arrangement includes only a single substrate foil, the focusing element grid being arranged on a first main surface of the substrate foil and the colored motif grid in an embossing lacquer layer on the opposing second main surface of the substrate foil. The colored motif grid is arranged inside between the embossing lacquer layer and the single substrate foil and is thus well protected. The colored motif grid is especially formed by depressions in the embossing lacquer layer that are filled with an ink based on soluble dyes or based on color pigments. Alternatively, the colored motif grid can also be formed by depressions in the embossing lacquer layer that are filled with a colored laminating adhesive.

According to another preferred embodiment, the micro-optical depiction arrangement includes a first and a second substrate foil, between which the colored motif grid is present in an embossing lacquer layer, and in which the focusing element grid is arranged on an outside main surface of one of the substrate foils. In this embodiment, the colored motif grid is especially formed by depressions in the embossing lacquer layer that are filled with a colored laminating adhesive.

In a further, likewise preferred embodiment, the micro-optical depiction arrangement includes two substrate foils laminated onto one another, the colored motif grid being arranged on the outside main surface of one of the substrate foils and the focusing element grid on the outside main surface of the other of the substrate foils.

In all cited embodiments, the embossing lacquer layer including the colored motif grid can itself be designed to be colored. In advantageous embodiments, in addition to the colored motif grid in the embossing lacquer layer, at least one further colored motif grid can be arranged on the second main surface of the substrate foil bearing the focusing element grid.

In all embodiments, the micro-optical depiction arrangement advantageously exhibits a motif grid having micromotif elements whose line width is between about 1 μm and about 10 μm and/or whose pattern depth is between about 1 μm and about 20 μm, preferably between about 1 μm and about 10 μm. The lateral dimensions of the micromotif elements are preferably between about 5 μm and about 50 μm, especially between about 10 μm and about 35 μm.

In a preferred embodiment, the object constitutes a security element, especially a security thread, a label or a transfer element for application to a data carrier. For this, the security element can, for example, be furnished to be capable of hot-melting. The total thickness of the security element is expediently between about 20 μm and about 60 μm, preferably between about 30 μm and about 50 μm. It is likewise advantageous when the object is a data carrier, especially a banknote, a value document, a passport, an identification card or a certificate.

Further exemplary embodiments and advantages of the present invention are described below with reference to the drawings. To improve clarity, a depiction to scale and proportion was dispensed with in the drawings.

Figure 2:
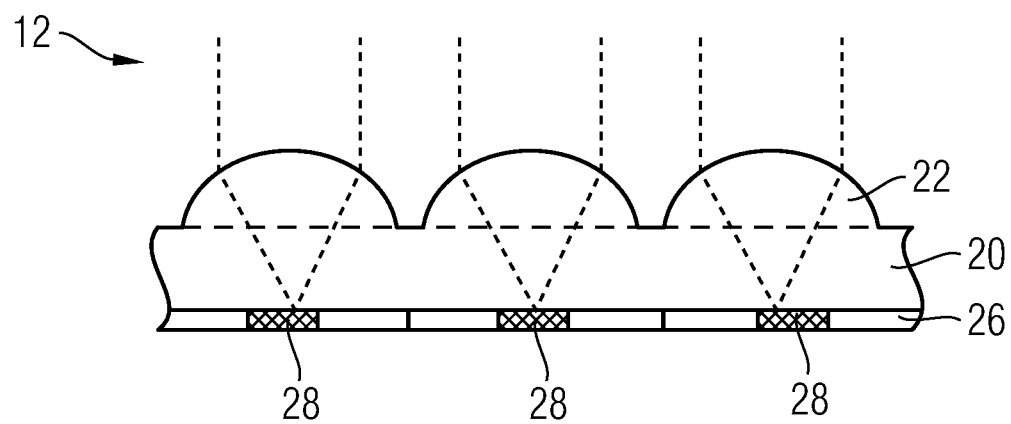
Figure 3A:
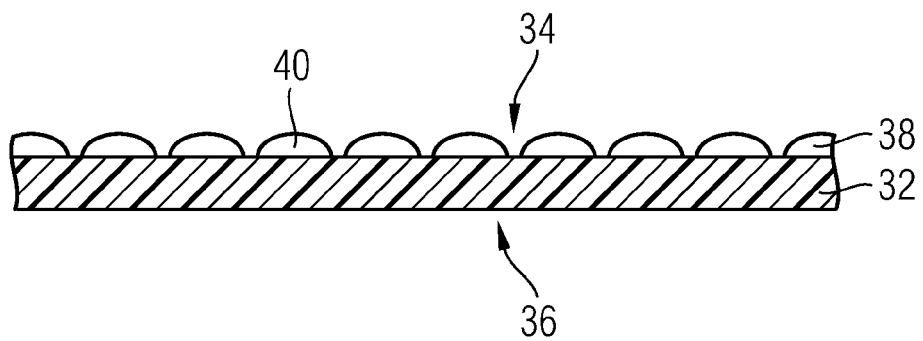
Figure 3B:
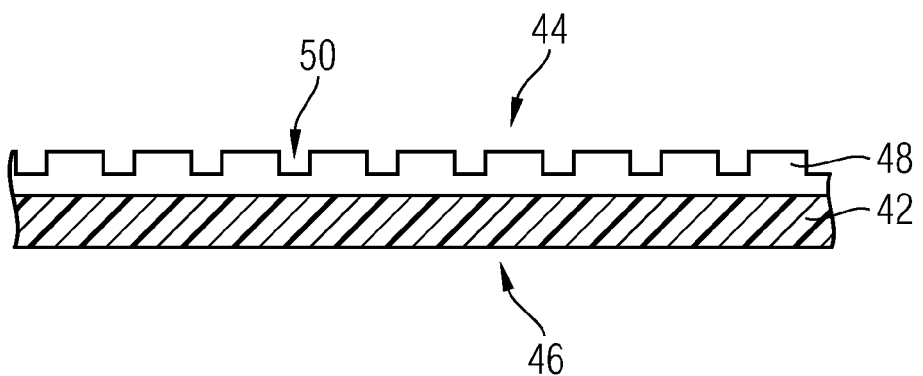
Figure 3C:
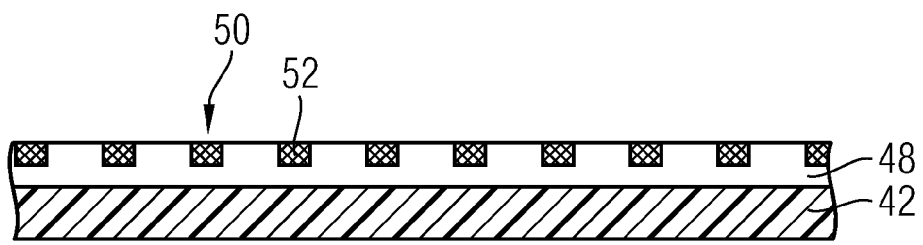
Figure 3D:
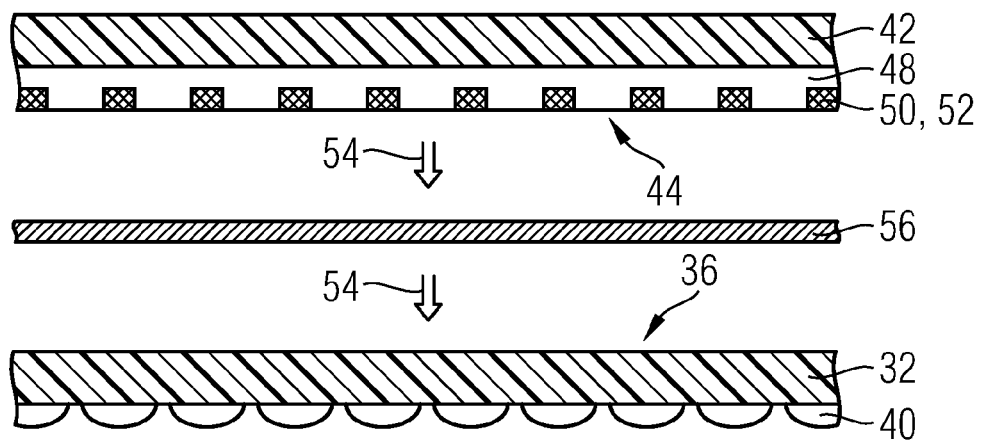
Figure 3E:
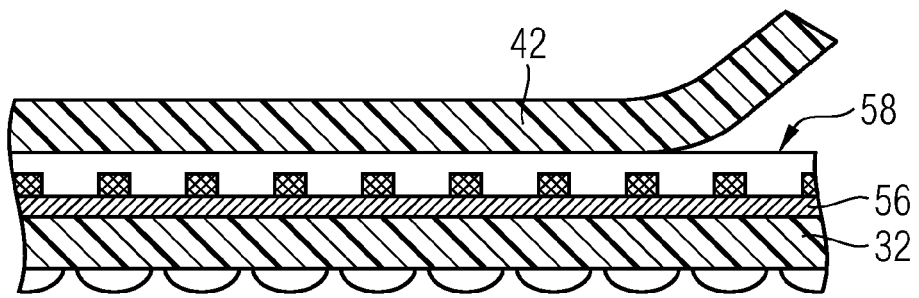
Figure 3F:
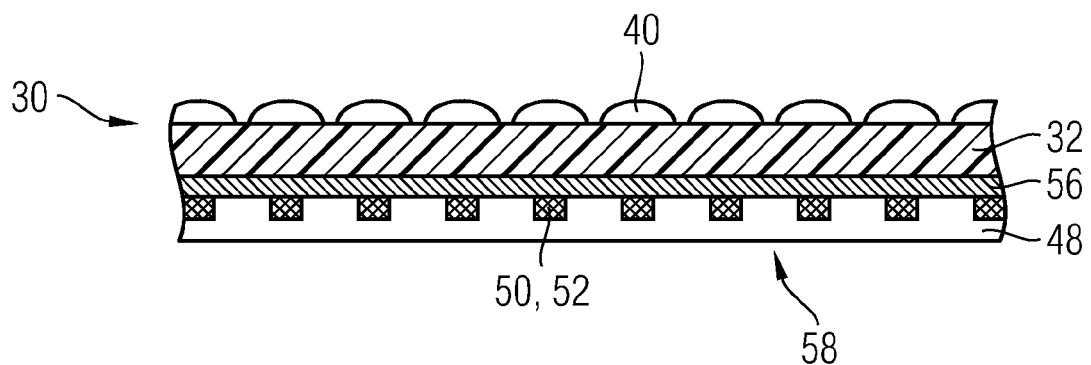
Figure 4:
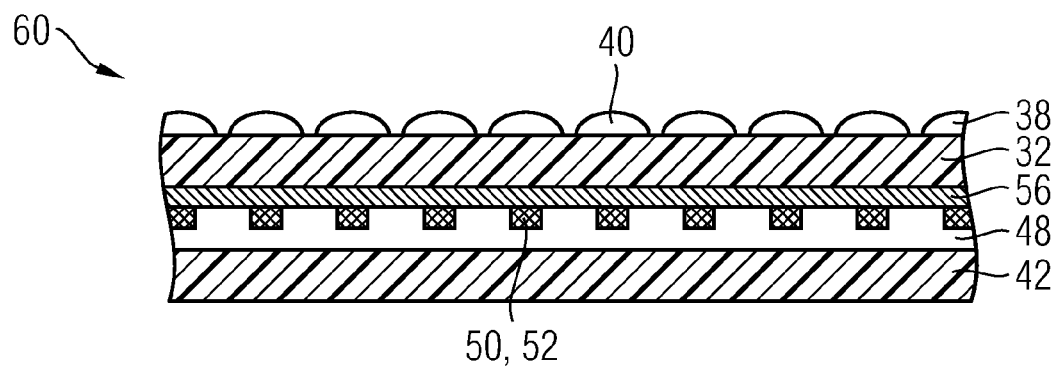
Figure 6A:
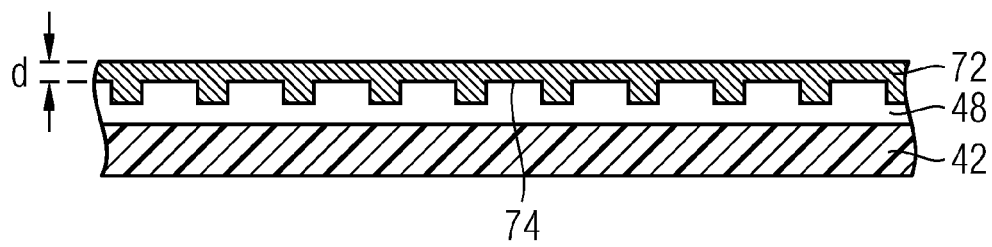
Figure 6B:
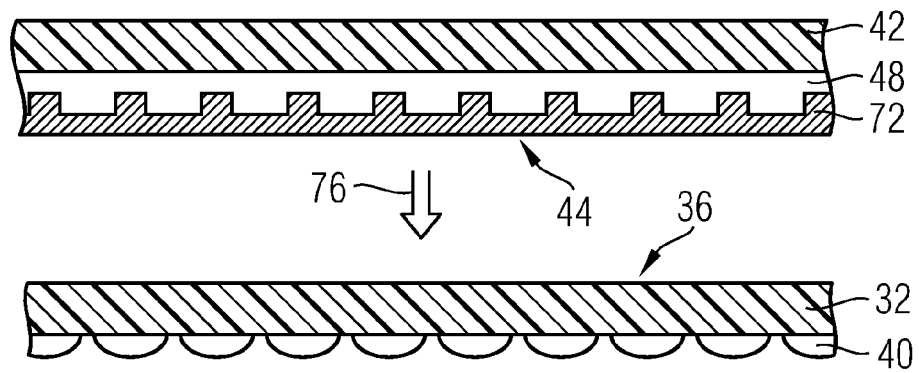
Figure 6C:
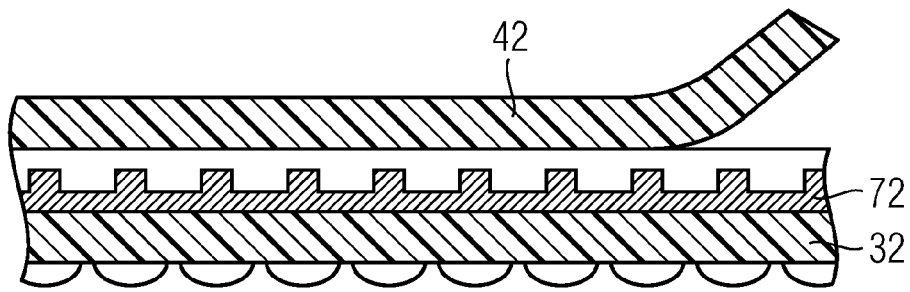
Figure 6D:
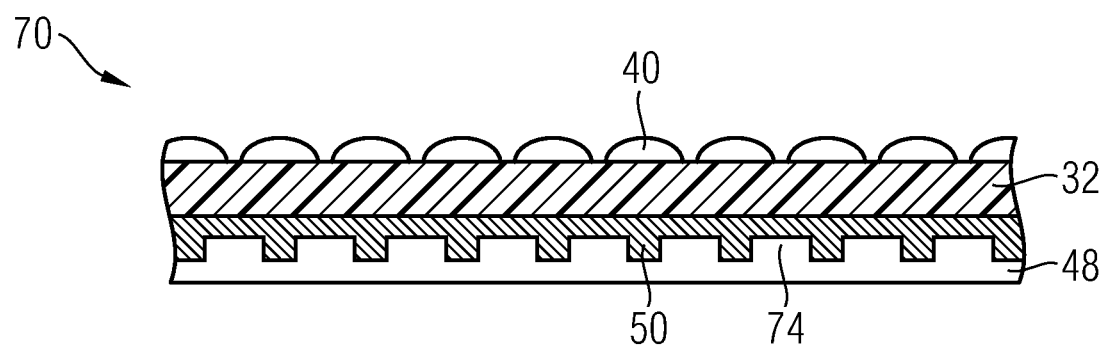
Figure 7:
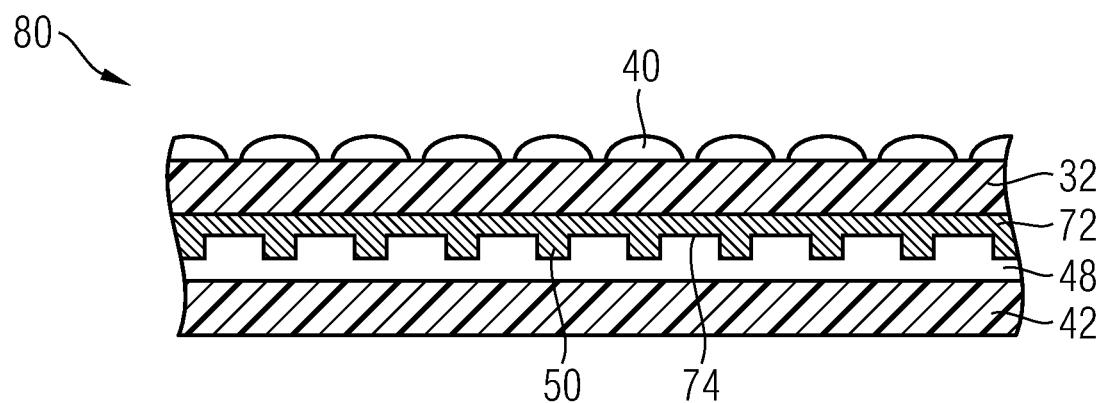

Shown are:

FIG. 1 a schematic diagram of a banknote having an embedded security thread and an affixed transfer element, FIG. 2 schematically, the layer structure of a security thread according to the present invention, in cross section, FIG. 3 in (*a*) to (*f*), intermediate steps in the manufacture of a moiré magnification arrangement according to the present invention, FIG. 4 a variant of the present invention in which the second substrate foil remains in the moiré magnification arrangement permanently, FIG. 5 in (*a*) and (*b*), intermediate steps in the manufacture of a moiré magnification arrangement according to a further exemplary embodiment of the present invention, FIG. 6 in (*a*) to (*d*), intermediate steps in the manufacture of a moiré magnification arrangement according to yet a further exemplary embodiment of the present invention, and FIG. 7 a modification of the variant in FIG. 6, in which the second substrate foil remains in the moiré magnification arrangement permanently.

The invention will now be explained using a security element for a banknote as an example. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote.

Both the security thread 12 and the transfer element 16 can include a micro-optical depiction arrangement according to an exemplary embodiment of the present invention. As described in greater detail above, such a micro-optical depiction arrangement can especially be developed as a moiré magnification arrangement, as a moiré-type micro-optical magnification arrangement or as a modulo magnification arrangement. The functional principle and the inventive manufacturing method for such arrangements are described in greater detail in the following based on the security thread 12 having a moiré magnification arrangement.

FIG. 2 shows schematically the layer structure of a security thread 12, in cross section, with only the portions of the layer structure that are required to explain the functional principle being depicted. The security thread 12 includes a substrate 20 in the form of a transparent plastic foil, in the exemplary embodiment a polyethylene terephthalate (PET) foil about 20 μm thick. The top of the substrate foil 20 is provided with a grid-shaped arrangement of microlenses 22 that form, on the surface of the substrate foil, a two-dimensional Bravais lattice having a prechosen symmetry. The Bravais lattice can exhibit, for example, a hexagonal lattice symmetry, but due to the higher counterfeit security, a lower symmetry, and thus a more general shape, are preferred, especially the symmetry of a parallelogram lattice.

The spacing of adjacent microlenses 22 is preferably chosen to be as small as possible in order to ensure as high an areal coverage as possible and thus a high-contrast depiction. The spherically or aspherically designed microlenses 22 preferably exhibit a diameter between 5 μm and 50 μm and especially a diameter between merely 10 μm and 35 μm and are thus not perceptible with the naked eye.

On the bottom of the transparent plastic foil 20, a motif layer 26 is arranged that includes a likewise grid-shaped arrangement of identical micromotif elements 28. Also the arrangement of the micromotif elements 28 forms a two-dimensional Bravais lattice having a prechosen symmetry, for example a hexagonal lattice symmetry or the symmetry of a parallelogram lattice.

As indicated in FIG. 2 through the offset of the micromotif elements 28 with respect to the microlenses 22, according to the present invention, the Bravais lattice of the micromotif elements 28 differs slightly in its symmetry and/or in the size of its lattice parameters from the Bravais lattice of the microlenses 22 to produce the desired moiré magnification effect. Here, the lattice period and the diameter of the micromotif elements 28 are on the same order of magnitude as those of the microlenses 22, so in the range from 5 μm to 50 μm, especially in the range from 10 μm to 35 μm, such that also the micromotif elements 28 are not perceptible with the naked eye.

The optical thickness of the substrate foil 20 and the focal length of the microlenses 22 are coordinated with each other in such a way that the motif layer 26 and thus the micromotif elements 28 are spaced approximately the lens focal length apart. Due to the slightly differing lattice parameters, the viewer sees, when viewing from above through the microlenses 22, a somewhat different sub-region of the micromotif elements 28 each time, such that the plurality of microlenses 22 produces, overall, a magnified image of the micromotif elements 28. Here, the resulting moiré magnification depends on the relative difference between the lattice parameters of the Bravais lattices used. If, for example, the grating periods of two hexagonal lattices differ by 1%, then a 100× moiré magnification results. For a more detailed description of the functional principle and for advantageous arrangements of the motif grids and the microlens grids, reference is made to publications DE 10 2005 062 132 A1 and WO 2007/076952 A2, the disclosures of which are incorporated in the present application by reference.

The manufacture of a moiré magnification arrangement 30 according to the present invention will now be explained in greater detail with reference to FIGS. 3(a) to (f). As depicted in FIG. 3(a), first, in a step T1), a first substrate foil 32 having opposing main surfaces 34, 36 is provided. An embossing lacquer layer 38 composed of a thermoplastic or radiation-curing lacquer is applied to a first main surface 34 of the first substrate foil 32, and a desired grid arrangement of microlenses 40 is embossed in the embossing lacquer layer 38.

Here, the layer thickness of the embossing lacquer 38 is coordinated with the size of the microlenses 40 to be embossed, and is typically between 1 μm and 15 μm, especially between 5 μm and 10 μm. To ensure that the embossed microlens arrangement 40 is firmly anchored on the substrate foil 32 after the embossing, a suitable combination of embossing lacquer 38 and substrate foil 32 having an adhesion-promoting precoating is used. Such an adhesion-promoting layer can already be applied at foil manufacture, or be imprinted before the application of the embossing lacquer. As substrate foils 32, thermally and mechanically stable foils may be used, especially PET foils, having a thickness from 6 μm to 60 μm, especially between 6 μm and 36 μm.

To design the visual appearance of the finished security element as desired, the second main surface 36 of the substrate foil 32, opposite the microlens grid 40, can also be provided with a partial metalization, with all known metals and demetalization variants being able to be used. The second main surface 36 can also be provided with a hologram or a thin-film element having a color-shift effect, these elements being perceptible in part after a partial demetalization of their metal layer(s) when viewed from the first main surface 34.

In addition to the first substrate foil 32, in a step T2), a second substrate foil 42 having opposing main surfaces 44, 46 is provided and an embossing lacquer layer 48 composed of a radiation-curing lacquer is applied to a first main surface 44 of the second substrate foil 42. Then a desired motif grid composed of microelements 50 is embossed in the embossing lacquer layer 48, as shown in FIG. 3(b).

The layer thickness of the embossing lacquer 48 is typically between 1 μm and 15 μm, especially between 4 μm and 8 μm. Here, the combination of embossing lacquer 48 and second substrate foil 42, as well as the process parameters when curing the embossed lacquer, are set such that the cured, embossed lacquer is contiguously detachable from the substrate foil 42 in a later method step (FIG. 3(e)), but does not detach from the substrate foil 42 by itself in the steps that follow first.

Then, to the embossed lacquer layer 48, 50 is applied, in a step F), an ink 52 that fills the depressions in the embossed in micropatterns 50. The ink 52 can be made up based on soluble dyes or based on color pigments. In some application types, excess ink can occur outside the depressions in the micropatterns 50. Such excess ink is removed, for example with an intaglio printing doctor blade, before further processing. After the application of the ink 52 and, if applicable, any necessary removal of excess ink, the layer sequence shown in FIG. 3(c), in which only the embossed depressions in the micropatterns 50 are filled with ink 52, is present on the second substrate foil 42.

The second foil 42 obtained in this way, having the embossed and ink-filled micropatterns 50, is now laminated, in a step K), with its first main surface 44, so with the side provided with micropatterns 50, forward, onto the second main surface 36 of the first substrate foil 32, so the foil side opposing the microlens grid 40, as depicted schematically in FIG. 3(d) by the arrow 54. For this, a transparent laminating adhesive 56, for example, can be imprinted on the side of the second substrate foil 42 provided with micropatterns 50. By varying the coating weight, the thickness of the adhesive layer 56 can be set systematically such that, through a precise focusing of the microlenses 40 on the micropatterns 50, 52, a sharp, moiré magnified image of the micropatterns 50, 52 can be obtained.

Thereafter, as shown in FIG. 3(e), the second substrate foil 42 is removed from the created layer composite to obtain the layer sequence 30 depicted in FIG. 3(f). It is understood that, to complete and finish the security thread 12, further per se known method steps are carried out. In particular, after the removal of the second substrate foil 42, the exposed, smooth surface 58 of the embossing lacquer can be provided as desired with colored printing layers or partial metalizations. Also the layer sequence 30 is equipped with a hot-melt adhesive and, as needed, an opaque white print for a true-to-side introduction into banknote paper to produce a security thread on its smooth side. Also the application of fluorescent lacquers is possible on this side.

As can be seen in FIG. 3(f), the colored micropatterns 50, 52 in the layer sequence 30 and accordingly also in the finished security thread 12 lie inside between the embossing lacquer layer 48 and the first substrate foil 32, such that they are very well protected against external influences.

At lamination, through a previously done setting of the printing lengths of the two foils 32, 42 to one another, and through suitable rotation of the second substrate foil 42 that is printed on with laminating adhesive 56, and/or of the approaching first substrate foil 32 in front of the laminating unit by a pivot roller system, the imaging of the micropatterns 50, 52 by the embossed microlenses 40 can be readjusted, if needed. Further details on such a pivot roller system are specified in the likewise pending German patent application DE 10 2007 063 277.2, the disclosure of which is incorporated in the present description by reference.

The laminating adhesive 56 can also be applied only partially, such that only a portion of the embossed micropatterns 50, 52 is transferred to the first substrate foil 32, while the regions on the second substrate foil 42 that are not provided with laminating adhesive remain and are removed with said substrate foil.

The layer structure of the finished security thread 12 can include additional function layers. In addition to the already mentioned hot-melt feature that serves to introduce or apply the security element, protective layers, cover layers or adhesive layers may be used, especially layers having visually and/or machine-perceptible security features, such as layers that are reflective across all or part of their surface, high-index or color-shifting layers, polarizing or phase-shifting layers, opaque or transparent conductive layers, magnetically hard or soft layers, and fluorescent or phosphorescent layers. The entire layer thickness of the structure is typically between 20 μm and 60 μm, with layer thicknesses between 30 μm and 50 μm being preferred.

FIG. 4 shows a variant 60 of the present invention, in which the second substrate foil 42 remains in the moiré magnification arrangement permanently. For this, the embossing lacquer 48 is anchored on the second substrate foil 42 in step T2), such that a firm, contiguous foil composite results. To not let the total thickness of the layer sequence 60 become too large, in this inventive variant, preferably second substrate foils having a foil thickness of 6 μm to 23 μm, especially of about 12 μm, are used. After the lamination step K), the embossed micropatterns 50, 52 are laminated into the thread composite, and the microlenses 40 sit outside on top.

Figure 5A:
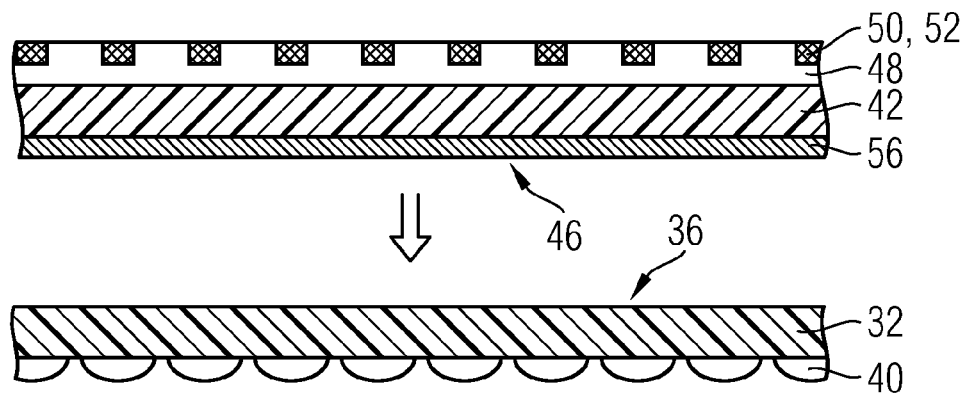
Figure 5B:
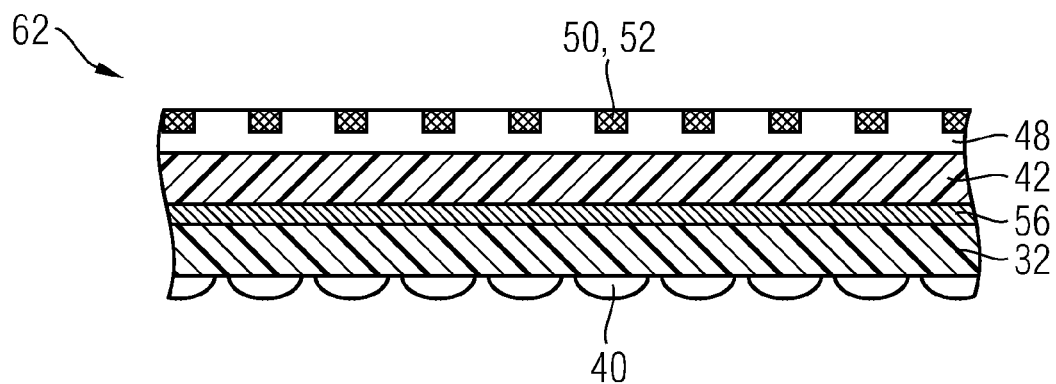

In the modification 62 depicted in FIG. 5, the processing of the first and second substrate foil 32, 42 is first done as in the inventive variant 60 in FIG. 4. However, in the lamination step K), the reading direction of the micropatterns 50, 52 is laterally reversed and the transparent laminating adhesive 56 is applied to the second main surface 46 of the second substrate foil 42, opposite the motif grid, as shown in FIG. 5(a). Then, the second substrate foil 42 is laminated with its second main surface 46 onto the second main surface 36 of the first substrate foil 32, such that the lamination is done foil against foil and the layer sequence 62 shown in FIG. 5(b) is obtained, in which the colored micropatterns 50, 52 and the microlenses 40 each lie outside on the laminated composite.

A further manufacturing variant is illustrated in FIGS. 6(a) to (d). Here, as already described for FIG. 3(a) and (b), first, a first substrate foil 32 is furnished with a desired grid arrangement composed of microlenses 40, and a second substrate foil 42 with a desired motif grid composed of microelements 50.

Then, to produce a colored contrast of the deep embossed structures, as shown in FIG. 6(a), a colored laminating adhesive 72 is applied to the embossed lacquer layer 48, 50. Here, the laminating adhesive 72 is applied in such a quantity that the depressions in the micropatterns 50 are completely filled, and furthermore, the laminating adhesive is present in the region of the raised areas 74 having a small layer thickness d of about 1 μm.

The second substrate foil 42 obtained in this way, having the embossed and colored, filled micropatterns, is then laminated (76), with its first main surface 44, onto the second main surface 36 of the first substrate foil 32, as shown in FIG. 6(b). In this variant of the present invention, the colored laminating adhesive 72 serves both to color the micropatterns 50 in step F, and to laminate the second substrate foil 42 in step K.

Thereafter, as shown in FIG. 6(c), the second substrate foil 42 is removed from the created layer composite to obtain the layer sequence 70 depicted in FIG. 6(d).

Here, the focus of the microlenses 40 is chosen such that it lies in the region of the depressions in the micropatterns 50 that are filled with colored laminating adhesive 72. Due to the thickness differences in the laminating adhesive 72, a clear contrast difference between the micropatterns 50 and the surrounding raised regions 74 results, such that the piece of information included in the micropatterns 50 is readable moiré magnified by the microlenses 40. Also in this variant of the present invention, the colored micropatterns 50 lie inside between the embossing lacquer layer 48 and the second substrate foil 32, and are thus excellently protected against external influences. Starting from the layer sequence 70, the further equipping of the security element can occur as in FIG. 3.

Also in the manufacturing process described in connection with FIG. 6, alternatively, it can be provided that the second substrate foil 42 is not removed, but rather remains in the moiré magnification arrangement permanently. In the inventive variant 80 shown in FIG. 7, in addition, the embossing lacquer 48 was anchored in step T2) on the second substrate foil 42. To not let the total thickness of the layer sequence 80 become too large, also in this inventive variant, preferably second substrate foils having a foil thickness of 6 μm to 23 μm, especially of about 12 μm, were used. After the lamination step K), the embossed micropatterns 50 are laminated into the thread composite, and the microlenses 40 sit outside on top.

We claim:

1. A method for producing, for the depiction of a specified motif, a micro-optical depiction arrangement that exhibits a colored motif grid, composed of a plurality of micromotif elements, and a focusing element grid, composed of a plurality of microfocusing elements, that reconstructs the specified motif when the micromotif elements are viewed, and in the method, T1) a first substrate foil having opposing main surfaces is provided, and an embossing lacquer is applied on a first main surface of the first substrate foil and is embossed in the form of the focusing element grid composed of an at least locally periodic arrangement of a plurality of microfocusing elements, T2) a second substrate foil having opposing main surfaces is provided, and an arrangement of colored micromotif elements is produced in the form of the motif grid on a first main surface of the second substrate foil, and K) the second substrate foil is laminated, with at least one laminating adhesive, onto the second main surface, opposite the focusing element grid, of the first substrate foil in that
   either a transparent laminating adhesive is applied to the motif-grid-exhibiting first main surface of the second substrate foil, and the second substrate foil is laminated, with its first main surface, onto the second main surface of the first substrate foil,
   or a transparent laminating adhesive is applied to the second main surface of the first substrate foil, opposite the focusing element grid, and the second substrate foil is laminated, with its motif-grid-exhibiting first main surface, onto the second main surface of the first substrate foil, characterized in that the second substrate foil is removed after the lamination onto the first substrate foil.

2. The method according to claim 1, characterized in that, in step T2), first, in a step
   T2P) the second substrate foil having opposing main surfaces is provided, and an embossing lacquer is applied on the first main surface of the second substrate foil and is embossed in the form of the motif grid composed of an arrangement of micropatterns whose forms correspond to the desired micromotif elements, and in a step
   T2F) the embossed micropatterns of the second substrate foil are filled with an ink.

3. The method according to claim 1, characterized in that the coating weight of the transparent laminating adhesive is chosen according to the desired spacing of the focusing element grid and the motif grid.

4. The method according to claim 1, characterized in that, after the removal of the second substrate foil, the then exposed surface of the arrangement of the colored micromotif is provided with a printing layer or a metalization.

5. The method according to claim 2, characterized in that the embossing lacquer in step T2P) is anchored on the second substrate foil, and the second substrate foil remains in the micro-optical depiction arrangement permanently.

6. A method for producing, for the depiction of a specified motif, a micro-optical depiction arrangement that exhibits a colored motif grid, composed of a plurality of micromotif elements, and a focusing element grid, composed of a plurality of microfocusing elements, that reconstructs the specified motif when the micromotif elements are viewed, and in the method,
   T1) a first substrate foil having opposing main surfaces is provided, and an embossing lacquer is applied on a first main surface of the first substrate foil and is embossed in the form of the focusing element grid composed of an at least locally periodic arrangement of a plurality of microfocusing elements,
   T2) a second substrate foil having opposing main surfaces is provided, and an arrangement of colored micromotif elements is produced in the form of the motif grid on a first main surface of the second substrate foil in that, first, in a step
   T2P) the second substrate foil having opposing main surfaces is provided, and an embossing lacquer is applied on the first main surface of the second substrate foil and is embossed in the form of the motif grid composed of an arrangement of micropatterns whose shapes correspond to the desired micromotif elements, and in a step
   T2F) the embossed micropatterns of the second substrate foil are filled with an ink, and
   K) the second substrate foil is laminated, with at least one laminating adhesive, onto the second main surface, opposite the focusing element grid, of the first substrate foil, characterized in that, in step T2F), either at least one colored laminating adhesive is applied to the motif-grid-exhibiting first main surface of the second substrate foil, which adhesive fills the micropatterns and serves to laminate the second substrate foil in step K), or at least one colored laminating adhesive is applied to the second main surface, opposite the focusing element grid, of the first substrate foil, and in step K), the second substrate foil is laminated, with its motif-grid-exhibiting first main surface, onto the second main surface of the first substrate foil, the colored laminating adhesive applied there filling the micropatterns of the second substrate foil;
   wherein the at least one colored laminating adhesive colors the micropatterns and produces a colored contrast of the embossed micropatterns, and
   wherein the coating weight of the at least one colored laminating adhesive is chosen such that the embossed micropatterns are completely filled and the laminating adhesive is present in the region outside the micropatterns in a small layer thickness of 3 µm or less;
   wherein the second substrate foil is removed after the lamination onto the first substrate foil.

7. The method according to claim 6, characterized in that, in step K), either a transparent laminating adhesive is applied to the second main surface, opposite the motif grid, of the second substrate foil, and the second substrate foil is laminated, with its second main surface, onto the second main surface of the first substrate foil, or a transparent laminating adhesive is applied to the second main surface, opposite the focusing element grid, of the first substrate foil and the second substrate foil is laminated, with its second main surface, opposite the motif grid, onto the second main surface of the first substrate foil.

8. The method according to claim 2, characterized in that, in step T2F), an ink based on soluble dyes or based on color pigments is applied to the embossed micropatterns.

9. The method according to claim 2, characterized in that, in step T2F), an ink based on a lacquer medium having metallic nanoparticles is applied.

10. The method according to claim 8, characterized in that any excess ink present outside the embossed micropatterns is removed.

11. The method according to claim 6, wherein the small layer thickness is 2 µm or less, and especially of about 1 µm.

12. The method according to claim 6, characterized in that, after the removal of the second substrate foil, the then exposed surface of the embossing layer is provided with a printing layer or a metalization.

13. The method according to claim 6, characterized in that the embossing lacquer in step T2P) is anchored on the second substrate foil, and the second substrate foil remains in the micro-optical depiction arrangement permanently.

14. The method according to claim 1, characterized in that, as the embossing lacquer in step T1), a thermoplastic or radiation-curing lacquer is applied, preferably in a layer thickness between 1 µm and 15 µm, particularly preferably between 5 µm and 10 µm.

15. The method according to claim 1, characterized in that the second main surface of the first substrate foil is provided with a partial metalization before the lamination step K).

16. The method according to claim 15, characterized in that the partial metalization is produced as part of a hologram or a thin-film element having a color-shift effect.

17. The method according to claim 2, characterized in that, as the embossing lacquer in step T2P), a thermoplastic or radiation-curing lacquer is applied, preferably in a layer thickness between 1 μm and 15 μm, particularly preferably between 4 μm and 8 μm.

18. The method according to claim 8, characterized in that any excess ink present outside the embossed micropatterns is squeegeed off.

* * * * *